(12) United States Patent
Keum et al.

(10) Patent No.: US 9,992,035 B2
(45) Date of Patent: *Jun. 5, 2018

(54) APPARATUS AND METHOD FOR SHARING A BOOKMARK WITH OTHER USERS IN A HOME NETWORK

(75) Inventors: Ji-Eun Keum, Gyeonggi-do (KR); Se-Hee Han, Seoul (KR); Bo-Sun Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/543,417

(22) Filed: Jul. 6, 2012

(65) Prior Publication Data
US 2012/0271889 A1 Oct. 25, 2012

Related U.S. Application Data

(63) Continuation of application No. 12/539,935, filed on Aug. 12, 2009, now Pat. No. 8,239,574.

(30) Foreign Application Priority Data

Aug. 12, 2008 (KR) ........................ 10-2008-0078947

(51) Int. Cl.
*G06F 15/16* (2006.01)
*H04L 12/28* (2006.01)
(Continued)

(52) U.S. Cl.
CPC ...... *H04L 12/2812* (2013.01); *H04L 12/2825* (2013.01); *H04N 21/43615* (2013.01);
(Continued)

(58) Field of Classification Search
CPC ............ H04L 12/2812; H04L 12/2825; H04N 21/43615; H04N 21/4661; H04N 21/64322
(Continued)

(56) References Cited

U.S. PATENT DOCUMENTS 6,211,871 B1 * 4/2001 Himmel ............ G06F 17/30884
707/E17.114
6,460,038 B1 * 10/2002 Khan ................ G06F 17/30884
(Continued)

FOREIGN PATENT DOCUMENTS

KR 1020070084183 8/2007
WO WO 01/55909 8/2001

OTHER PUBLICATIONS

Chinese Office Action dated Jan. 5, 2015 issued in counterpart application No. 200980131373.X.
(Continued)

*Primary Examiner* — Davoud Zand
(74) *Attorney, Agent, or Firm* — The Farrell Law Firm, P.C.

(57) ABSTRACT

A method and apparatus for sharing a bookmark, which is created by a user, with other users. In a method for sharing a bookmark in a home network, information of a bookmark for sharing in a home network device of a bookmark creator is created. The bookmark or the information of the bookmark is stored in an Internet Protocol TV (IPTV) terminal in the home network of the bookmark creator. The bookmark or the information of the bookmark is then transmitted from the IPTV terminal to an IPTV service provider.

34 Claims, 10 Drawing Sheets

(51) Int. Cl.
*H04N 21/436* (2011.01)
*H04N 21/466* (2011.01)
*H04N 21/643* (2011.01)

(52) U.S. Cl.
CPC ... *H04N 21/4661* (2013.01); *H04N 21/64322* (2013.01); *H04L 2012/2849* (2013.01)

(58) Field of Classification Search
USPC ........................................................ 709/204
See application file for complete search history.

(56) References Cited

U.S. PATENT DOCUMENTS

| | | | | |
|---|---|---|---|---|
| 7,127,454 | B2* | 10/2006 | Deguchi | G06F 17/30749 |
| 7,289,812 | B1* | 10/2007 | Roberts | G09B 29/10 |
| | | | | 342/350 |
| 7,631,336 | B2 | 12/2009 | Diaz Perez | |
| 7,636,705 | B2* | 12/2009 | Kim | G11B 27/11 |
| 2002/0099784 | A1 | 7/2002 | Tran | |
| 2003/0037035 | A1* | 2/2003 | Deguchi | G06F 17/30749 |
| 2003/0046290 | A1* | 3/2003 | Yamada | G06F 17/30884 |
| 2003/0229900 | A1* | 12/2003 | Reisman | G06F 17/30873 |
| | | | | 725/87 |
| 2004/0002938 | A1* | 1/2004 | Deguchi | G06F 17/30 |
| 2005/0131866 | A1* | 6/2005 | Badros | G06F 17/30867 |
| 2005/0198193 | A1* | 9/2005 | Halme | G06F 17/30784 |
| | | | | 709/217 |
| 2005/0208892 | A1* | 9/2005 | Kotola | H04L 67/04 |
| | | | | 455/41.2 |
| 2005/0210145 | A1* | 9/2005 | Kim | G06F 17/30849 |
| | | | | 709/231 |
| 2005/0246622 | A1 | 11/2005 | Ahn et al. | |
| 2006/0161742 | A1* | 7/2006 | Sugimoto | H04N 7/17318 |
| | | | | 711/154 |
| 2006/0206480 | A1 | 9/2006 | Heidloff et al. | |
| 2006/0294039 | A1* | 12/2006 | Mekenkamp | G06F 17/301 |
| 2007/0022437 | A1* | 1/2007 | Gerken | H04N 7/17318 |
| | | | | 725/41 |
| 2007/0043608 | A1* | 2/2007 | May | G06Q 10/0633 |
| | | | | 705/7.27 |
| 2007/0050837 | A1* | 3/2007 | Lopez-Estrada | G06F 17/30855 |
| | | | | 725/138 |
| 2007/0073704 | A1 | 3/2007 | Bowden et al. | |
| 2007/0101394 | A1* | 5/2007 | Fu | G11B 27/105 |
| | | | | 725/134 |
| 2007/0110397 | A1* | 5/2007 | Tanikawa | G11B 27/034 |
| | | | | 386/241 |
| 2007/0150930 | A1* | 6/2007 | Koivisto | G06F 17/30884 |
| | | | | 725/134 |
| 2007/0156627 | A1* | 7/2007 | D'Alicandro | G06F 17/30884 |
| 2007/0157252 | A1* | 7/2007 | Perez | G06Q 30/02 |
| | | | | 725/61 |
| 2007/0169155 | A1* | 7/2007 | Pasquale | H04N 5/44591 |
| | | | | 725/81 |
| 2007/0244903 | A1* | 10/2007 | Ratliff | G06F 17/30038 |
| 2007/0250864 | A1* | 10/2007 | Diaz Perez | G06Q 30/02 |
| | | | | 725/52 |
| 2008/0002945 | A1* | 1/2008 | Ushimaru | G11B 27/105 |
| | | | | 386/248 |
| 2008/0005126 | A1* | 1/2008 | Sankaran | G06F 17/3002 |
| 2008/0050096 | A1* | 2/2008 | Ryu | 386/99 |
| 2008/0086471 | A1* | 4/2008 | Ritter | G06F 17/30884 |
| 2008/0127255 | A1* | 5/2008 | Ress | H04N 7/17318 |
| | | | | 725/38 |
| 2008/0177858 | A1* | 7/2008 | Aarnio | H04L 67/20 |
| | | | | 709/217 |
| 2008/0187279 | A1* | 8/2008 | Gilley | G06Q 30/02 |
| | | | | 386/250 |
| 2008/0222630 | A1* | 9/2008 | Taylor | G06Q 30/02 |
| | | | | 717/176 |
| 2008/0229205 | A1* | 9/2008 | Lee | G06F 17/30817 |
| | | | | 715/723 |
| 2008/0250061 | A1* | 10/2008 | Kim | G11B 27/11 |
| 2009/0049118 | A1* | 2/2009 | Stevens | G06F 17/30017 |
| | | | | 709/203 |
| 2009/0119328 | A1* | 5/2009 | Raza | G06F 17/30884 |
| 2009/0235298 | A1* | 9/2009 | Carlberg | H04N 5/44543 |
| | | | | 725/24 |
| 2009/0241017 | A1* | 9/2009 | Brooks | G06F 17/30884 |
| | | | | 715/206 |
| 2009/0254823 | A1* | 10/2009 | Barrett | H04N 21/235 |
| | | | | 715/716 |
| 2010/0199327 | A1* | 8/2010 | Keum et al. | 726/3 |
| 2011/0138432 | A1* | 6/2011 | Mitra | H04N 21/443 |
| | | | | 725/109 |

OTHER PUBLICATIONS

Korean Office Action dated Oct. 27, 2014 issued in a counterpart application No. 10-2008-0078947.
Chinese Office Action dated Aug. 4, 2015 issued in a counterpart application No. 200980131373.X, 40 pages.
Chinese Office Action dated Oct. 30, 2015 issued in a counterpart application No. 200980131373.X, 72 pages.
European Search Report dated Apr. 20, 2016 issued in a counterpart application No. 09806853.9-1862, 8 pages.
European Search Report dated Apr. 22, 2016 issued in a counterpart application No. 13179712.8-1862, 10 pages.
European Search Report dated Mar. 10, 2015 issued in a counterpart application No. 09806853.9-1862.
EP Summons to Attend Oral Proceedings dated Apr. 13, 2017 issued in a counterpart application No. 09806853.9-1862, 7 pages.
EP Summons to Attend Oral Proceedings dated Jul. 13, 2017 issued in a counterpart application No. 13179712.8-1862, 9 pages.
EP Decision to Refuse dated Feb. 19, 2018 issued in a counterpart application No. 09806853.9-1216, 47 pages.
EP Minutes of the Oral Proceedings dated Feb. 20, 2018 issued in a counterpart application No. 13179712.8-1216, 35 pages.

* cited by examiner

| METADATA | DESCRIPTION |
|---|---|
| SHARE | A NAME OR TITLE OF THE BOOKMARK FOT SHARE |
| share@creatorid | A USER ID WHO CREATE THE BOOKMARK |
| share@type | PUBILC, LIMITED PUBLIC, PRIVATE |
| share@shareuserid | A LIST OF USER ID WHO CAN SHARE THE BOOKMARK<br><br>(MANDATORY WHEN SHARE@TYPE IS "LIMITED PUBLIC") |
| share@validityperiod | THE AVAILABLE PERIOD OF THE BOOKMARK |

FIG.5A

| METADATA | DESCRIPTION |
|---|---|
| SHARE | A NAME OR TITLE OF THE BOOKMARK FOT SHARE |
| share@creatorid | A USER ID WHO CREATE THE BOOKMARK |
| share@shareuserid | A LIST OF USER ID WHO CAN SHARE THE BOOKMARK<br><br>A WILDCARD ("*") IMPLICLICATES THE PUBLIC SHARING USAGE; AN EMPTY STRING INDICATES THE NO SHARING USAGE ; OTHERWISE, THE SHARING TYPE WILL BE LIMITED SHARING USAGE FOR INDICATED USER. |
| share@validityperiod | THE AVAILABLE PERIOD OF THE BOOKMARK |

FIG.5B

APPARATUS AND METHOD FOR SHARING A BOOKMARK WITH OTHER USERS IN A HOME NETWORK

PRIORITY

This application is a Continuation of U.S. application Ser. No. 12/539,935, which was filed in the U.S. Patent and Trademark Office on Aug. 12, 2009, and claims priority under 35 U.S.C. § 119 to an application filed in the Korean Intellectual Property Office on Aug. 12, 2008 and assigned Serial No. 10-2008-0078947, the content of which is incorporated herein by reference.

BACKGROUND OF THE INVENTION

1. Field of the Invention

The present invention relates generally to an Internet broadcasting system supporting a broadcast service using Internet Protocol (IP), i.e., an Internet data transmission protocol (e.g., an IPTV service), and in particular, to a method for sharing an item (hereinafter referred to as bookmark) indicating a specific point of contents or a service represented by protocol interworking between various devices present in a home network with other IPTV broadcast service users.

2. Description of the Related Art

In the current IP-based convergence era, the convergence of communication and broadcast services is being touted as a highly marketable next-generation new business model and one of the next-generation market-leading technologies. In particular, IPTV is the largest one of communication/broadcast convergence services. IPTV is a technology that combines conventional television (TV), with voice and data technologies, thereby creating various new business models and services that support bidirectionality.

In particular, the IPTV technology provide the same service in different environments by providing services regardless of the types of terminals (e.g., stationary terminals such as personal computers (PCs) and TVs, and mobile terminals such as Personal Digital Assistants (PDAs)) and the types of networks (e.g., wired/wireless networks and broadcast networks) instead of providing specified services in the conventional limited terminal environments, and can create various services by considering the different environments.

FIG. 1 is a diagram illustrating a value chain of IPTV defined in Open IPTV Forum.

Referring to FIG. 1, IPTV service domains for providing IPTV to a service user 1100 are generally classified into five domains: a consumer domain 1101, a network provider domain 1102, a platform provider domain 1103, an IPTV service provider domain 1104, and a contents provider domain 1105.

The consumer domain 1101 consumes an IPTV service, and may include a terminal for receiving/using a service and a network (e.g., a home network) including a plurality of terminals. Examples of the terminal include settop boxes and portable terminals supporting wireless environments, such as mobile phones and PDAs.

The network provider domain 1102 connects the user 1100 and a platform or a service provider and provides various services and contents. A transmission system of the network provider domain 1102 may support various transmission technologies such as wired/wireless and broadcast technologies and generally includes an access network and a core or backbone network.

The platform provider domain 1103 provides a common service to IPTV service providers, e.g., user authentication and charging.

The IPTV service provider domain 1104 provides IPTV services to the consumer domain 1101. The IPTV service provider domain 1104 receives contents from contents providers and provides a service package thereof.

The contents provider domain 1105 owns contents, contents properties, and contents copyrights.

Scheduled content services, content on-demand services, and various IPTV services can be provided in the aforesaid five domains, and four types of functions of the services form one value chain.

A content production unit 1109 is located in the contents provider domains 1105 to produce and edit contents. The content aggregation unit 1108 is located in the IPTV service provider domain 1104, and receives contents from various content providers to create various services. The content delivery unit 1107 is located in the platform provider domain 1103 and the network provider domain 1102 to deliver services received from IPTV service providers (i.e., aggregated contents) to the consumer domain 1101. The content reconstitution unit 1106 is located in the consumer domain 1101 to convert the received contents into a format viewable by the user 1100.

The IPTV services are classified into a managed model and an unmanaged model (in an open Internet) according to provisions of Quality of Service (QoS).

The managed model is an integrated model in which a service provider manages the platform provider domain 1103, the network provider domain 1102, and the IPTV service provider domain 1104 in an integrated manner. The unmanaged model is a divided model in which a service provider is included in the IPTV service provider domain 1104 and other network providers (the network provider domain 1102 and the platform provider domain 1103) perform transmission.

In general, a home network includes an IP-based private network. The home network connects and controls various devices such as wireless devices, intelligent products such as electronic appliances that can communicate with other devices for configuring the electronic appliances, and PCs, through a virtual computing environment commonly referred to as middleware.

The middleware connects various digital devices in a peer-to-peer manner in order to provide communication between the devices. For example, middleware includes Home AV Interoperability (HAVI), Universal Plug and Play (UPnP), Java Intelligent Network Infra-structure (Jini), Home Wide Web (HWW). In particular, the UPnP network includes UPnP devices and UPnP services and operates according to the protocol therebetween.

The UPnP network includes: Controlled Devices (CDs) connected to an IP-based home network; and a Control Point (CP) for controlling the CDs.

The CP controls a CD, and requests/receives an event. The CD performs a function according to the request of the CP, and transmits an event to the CP requesting the event, if the state of the CD changes.

A UPnP audio/video (AV) technology enabling a user to enjoy multimedia contents, such as audio and video contents using UPnP technology is described in the UPnP AV standard.

FIG. 2 is a diagram illustrating a conventional UPnP AV architecture.

Referring to FIG. 2, according to the UPnP AV standard, a first AV device 20 is a media server that retains AV contents and stores, for example, various image files or audio/video files through a Content Directory Service (CDS). Herein, the CDS is installed in the media server 20 to provide metadata of contents, which are stored in the media server 20 or present in or outside a home network, to an AV Contents Provider (AVCP) 10.

Examples of the media server 20 include a settop box, a Digital Video Disc (DVD) player, an MP3 player, a Digital Still Camera (DSC), and a PC that includes a Hard Disk Drive (HDD), a flash memory, and an optical device such as a DVD or a Compact Disc (CD).

A second AV device 30 is a media rendering device that enables a user to enjoy AV contents. For example, the second AV device includes a Digital TV (DTV), a High Fidelity (HiFi) audio receiver, and a monitor. AV contents are received from the second AV device 20 through an Out-of-Band transmission protocol.

FIG. 3 is a flow diagram illustrating a conventional process for sharing a bookmark between home devices through the conventional UPnP.

Referring to FIG. 3, a user creates a bookmark of contents through a control point 10 (step 11) and stores the created bookmark in a media server 20 (step 12). Thereafter, when the control point 10 is used to give a reproduction command from a bookmark point of the contents (step 13), a media renderer 30 executes the contents with reference to a Uniform Resource Identifier (URI) of the contents and a bookmark start point from the media server 20.

Using the process illustrated in FIG. 3, several media renders 30 can share bookmarks stored in the media server 20.

While there are schemes for representing bookmark information of home contents created by users as UPnP objects, and mechanisms for creating/changing/deleting objects in an UPnP content directory service, there is no technique for using the bookmark created by the user in home devices of other users.

Table 1 below shows an example of a conventional UPnP bookmark. The title of contents is "Gone with the Wind", an object Identifier (ID) referred to by the bookmark is 1230131, and the time information of the bookmark indicates a point of 00:22:01 from the start point.

TABLE 1

```
<?xml version="1.0" encoding="UTF-8"?>
<DIDL-Lite
xmlns:dc="http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:xsi="http://www.w3.org/2001/XMLSchema-instance"
xsi:schemaLocation="
urn:schemas-upnp-org:metadata-1-0/DIDL-Lite/
http://www.upnp.org/schemas/av/didl-lite.xsd
urn:schemas-upnp-org:metadata-1-0/upnp/
http://www.upnp.org/schemas/av/upnp.xsd">
<item id="bookmark-763215" parentID="BC_001"
restricted="0">
<dc:title>Gone with the Wind</dc:title>
<upnp:class>object.item.bookmarkItem</upnp:class>
<upnp:deviceUDN serviceType="AVTransport:1"
serviceId="AVTransport">
uuid:2F5A2466-55EF-44af-953A-74DE96FF2B14
</upnp:deviceUDN>
<upnp:deviceUDN serviceType="RenderingControl:1"
serviceId="RenderingControl">
uuid:EF0DB408-3018-4e13-831A-8349CA543538
</upnp:deviceUDN>
<upnp:bookmarkedObjectID>1230131</upnp:bookmarkedObjectID>
<dc:date>2003-03-21T15:21:22</dc:date>
<upnp:stateVariableCollection serviceName="AVTransport">
```

TABLE 1-continued

```
<!--
The following stateVariableValuePairs XML Document needs to be
interpreted as a simple string and therefore needs to be properly escaped
-->
&lt;?xml version="1.0" encoding="UTF-8"?&gt;
&lt;stateVariableValuePairs
xmlns="urn:schemas-upnp-org:av:avs"
xmlns:xsi="http://www.w3.org/2001/XMLSchema-instance"
xsi:schemaLocation="
urn:schemas-upnp-org:av:avs
http://www.upnp.org/schemas/av/avs.xsd"&gt;
&lt;stateVariable variableName="RelativeTimePosition"&gt;
00:22:01
&lt;stateVariable&gt;
&lt;!-- More state variable value pairs can
be inserted here --&gt;
&lt;/stateVariableValuePairs&gt;
<!-- End of stateVariableValuePairs XML Document -->
</item>
```

SUMMARY OF THE INVENTION

The present invention has been designed to address at least the problems and/or disadvantages described above and to provide at least the advantages described below.

Accordingly, an aspect of the present invention is to provide a method and apparatus for sharing a bookmark, which is created by a user through UPnP, with other IPTV terminals in a home and with user IPTV terminals in other homes, using an IPTV service.

In accordance with an aspect of the present invention, a method for sharing a bookmark in a home network is provided. The method includes: determining information of a bookmark for share in a home network device of a bookmark creator; storing the bookmark or the information of the bookmark in an IPTV terminal in the home network of the bookmark creator; and transmitting the bookmark or the information of the bookmark from the IPTV terminal to an IPTV service provider.

In accordance with another aspect of the present invention, a system for sharing a bookmark in a home network is provided. The system includes: a bookmark creator home network device determining information of a bookmark for share; a bookmark creator home network IPTV terminal storing the bookmark or the information of the bookmark and transmitting the same to an IPTV service provider; a bookmark sharer home network device requesting information of a bookmark from a bookmark sharer home network IPTV terminal; the bookmark sharer home network IPTV terminal requesting the information of the bookmark from the IPTV service provider; and the IPTV service provider receiving a bookmark with information determined or the information of the bookmark from the bookmark creator home network IPTV terminal, storing the same, selecting an available bookmark according to the bookmark information request of the bookmark sharer home network IPTV terminal, and transmitting a response including the selected bookmark to the bookmark sharer home network device.

In accordance with another aspect of the present invention, a method for operating an IPTV service provider to share a bookmark in a home network is provided. The method includes: receiving a bookmark with information determined or the information of the bookmark from a bookmark creator home network IPTV terminal; requesting the information of the bookmark from a bookmark sharer home network IPTV terminal; selecting an available bookmark according to the bookmark information request; and transmitting a response including the selected bookmark to a bookmark sharer home network device.

In accordance with another aspect of the present invention, an apparatus of an IPTV service provider for sharing a bookmark in a home network is provided. The apparatus includes: a controller receiving a bookmark with information determined or the information of the bookmark from a bookmark creator home network IPTV terminal, storing the same, selecting an available bookmark according to the bookmark information request of a bookmark sharer home network IPTV terminal, and transmitting a response including the selected bookmark to a bookmark sharer home network device.

BRIEF DESCRIPTION OF THE DRAWINGS

The above and other aspects, features, and advantages of the present invention will become more apparent from the following detailed description when taken in conjunction with the accompanying drawings in which:

FIG. 5A is a table illustrating metadata used to share a UPnP bookmark with other users according to an embodiment of the present invention;

FIG. 5B is a table illustrating metadata used to share a UPnP bookmark with other users according to an embodiment of the present invention;

DETAILED DESCRIPTION OF EMBODIMENTS OF THE PRESENT INVENTION

Figure 1:
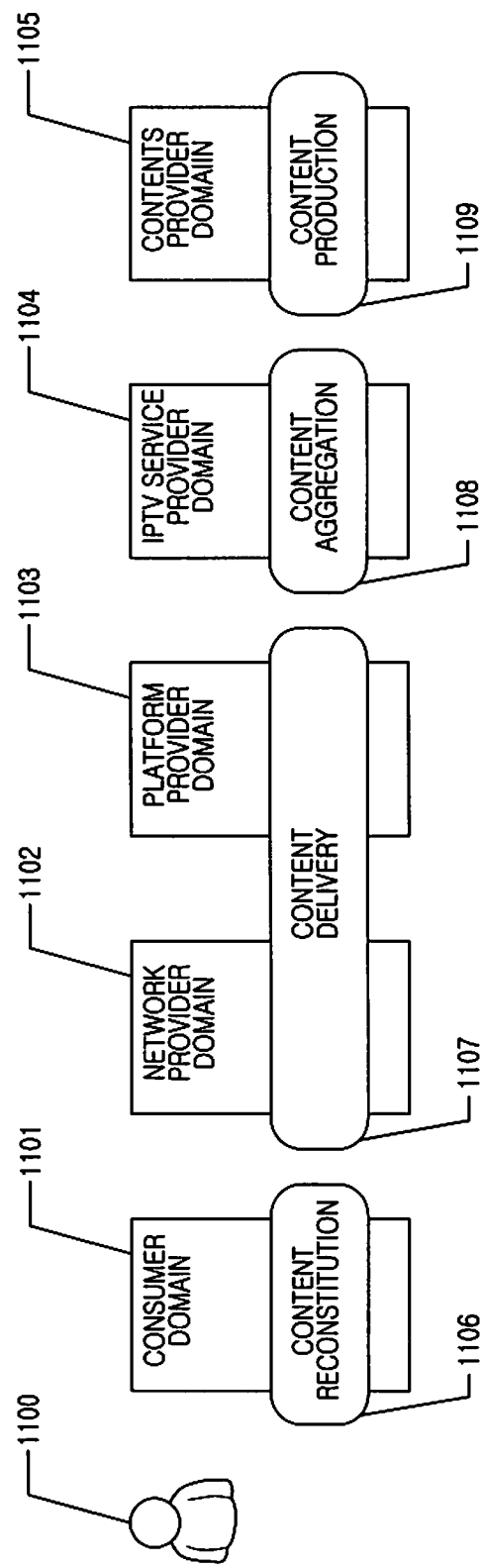
FIG. 1 is a diagram illustrating a conventional value chain of IPTV defined in Open IPTV Forum.
Figure 2:
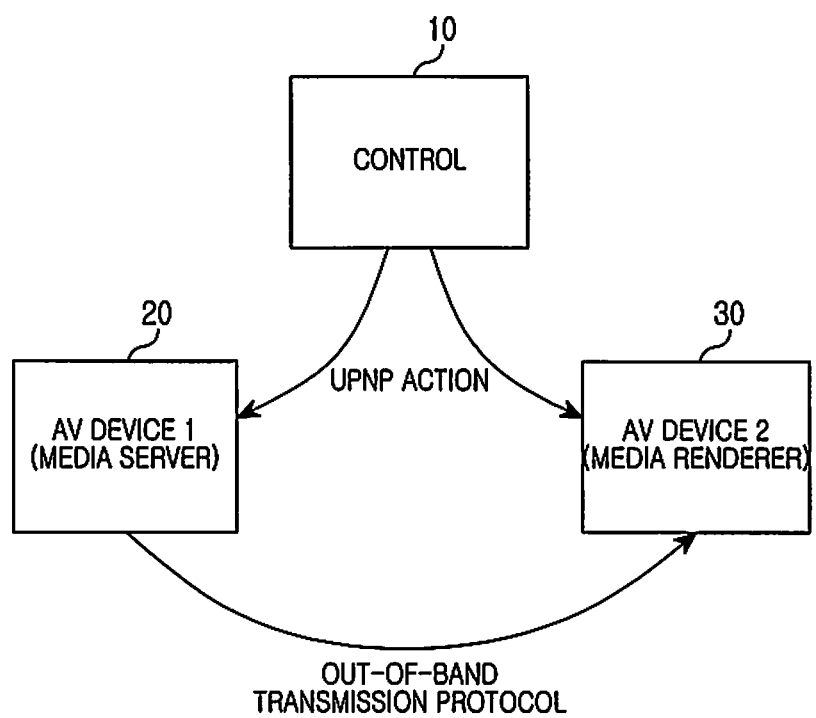
FIG. 2 is a diagram illustrating a conventional UPnP AV architecture.
Figure 3:
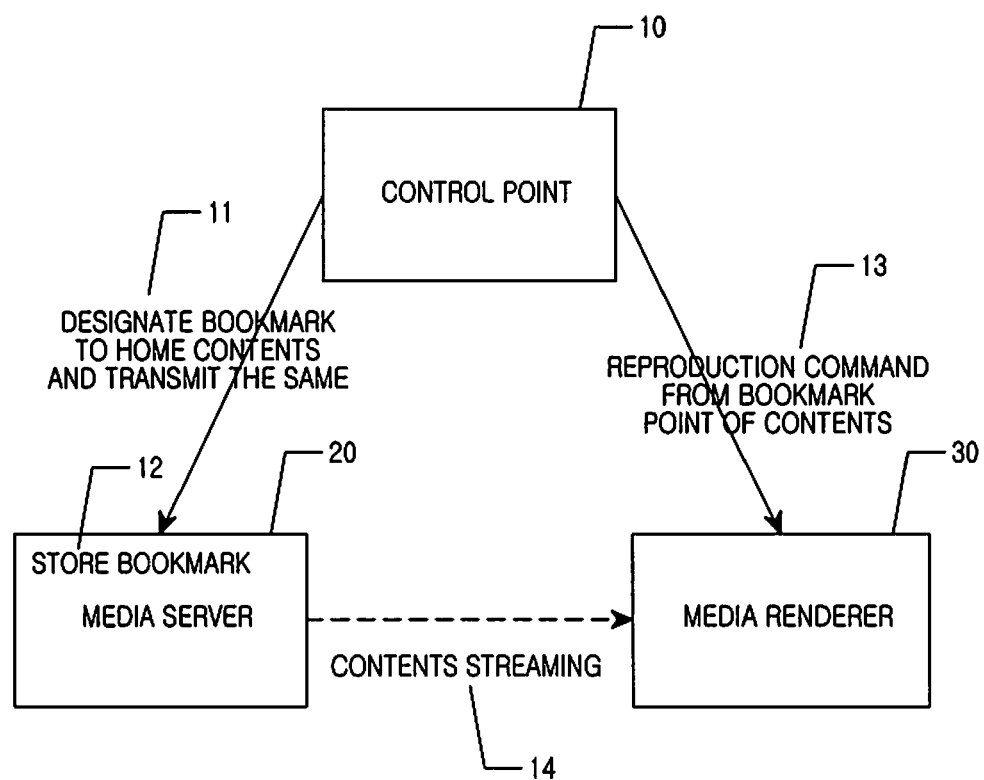
FIG. 3 is a flow diagram illustrating a process for sharing a bookmark between home devices through the conventional UPnP.

Embodiments of the present invention will be described herein below with reference to the accompanying drawings. Like reference numerals in the drawings in the drawings denote like elements.

The present invention may, however, be embodied in many different forms and should not be construed as being limited to the embodiments set forth herein. The embodiments described below are provided so that this disclosure will be thorough and complete, and will fully convey the concept of the invention to those skilled in the art. In the following description, detailed descriptions of well-known functions or constructions will be omitted because they would obscure the present invention in unnecessary detail.

For the convenience of description of the embodiments of the present invention, the terms of entities defined in Open IPTV Forum (OIF), which is the standardization organization of IPTV or UPnP that is the standard of home communication, will be used in the same way. However, these standards and terms should not be construed as limiting the scope of the present invention, and they may be applicable to any system that has the similar technical background.

Figure 4:
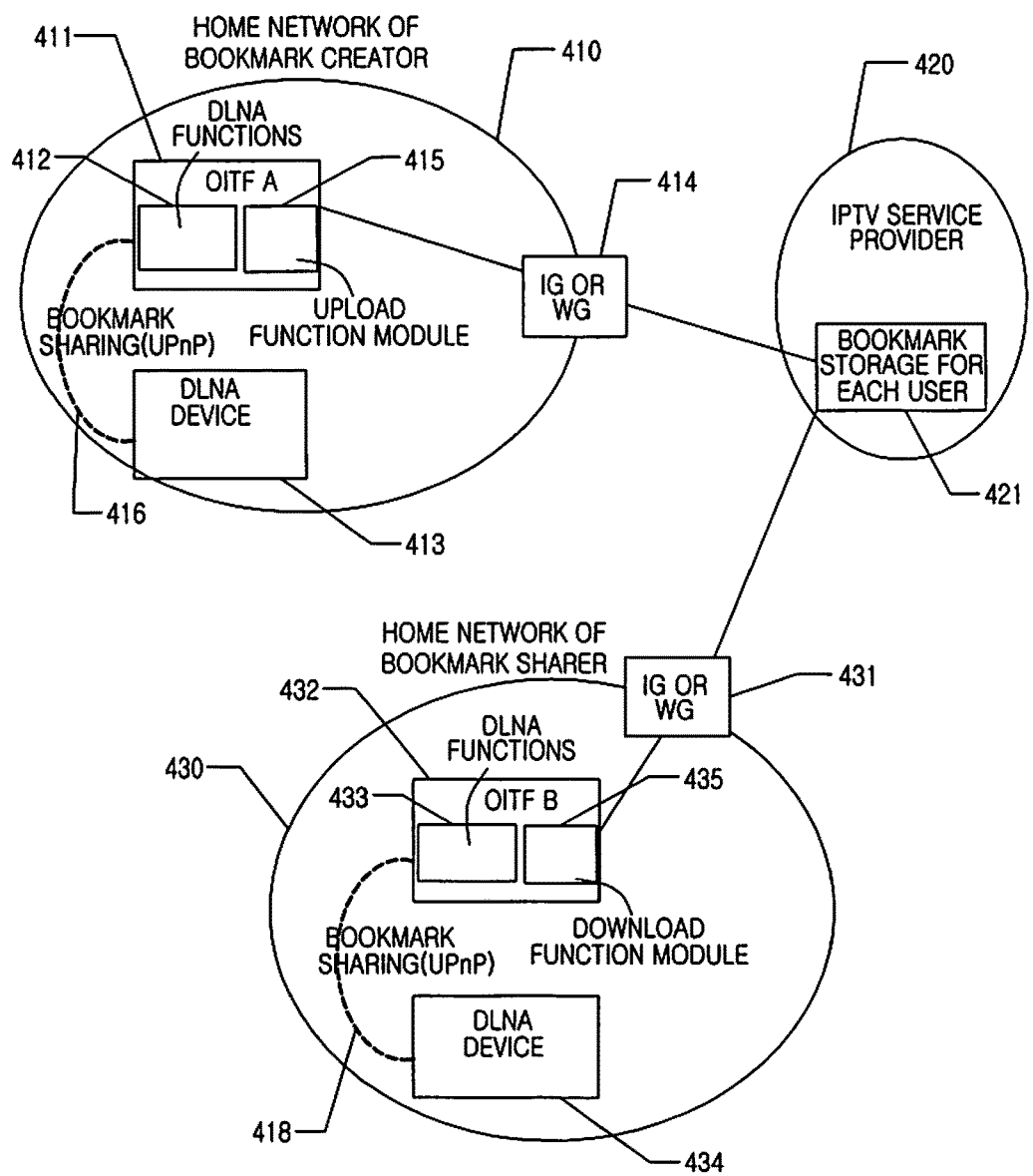
FIG. 4 is a block diagram of a system for sharing a bookmark with other users according to an embodiment of the present invention.

FIG. 4 is a block diagram of a system for sharing a bookmark with other users according to an embodiment of the present invention.

Referring to FIG. 4, in a bookmark creator home network 410, a UPnP bookmark is shared (step 416) between a Digital Living Network Alliance (DLNA) terminal 413 or an Open IPTV Terminal Function (OITF) terminal A 411 including a DLNA function 412.

The OITF terminal A 411 includes a function module 415 for uploading a bookmark, and is connected to an IPTV service provider network 420 through an IP Multimedia Subsystem (IMS) Gateway (IG) or a WAN Gateway (WG). A storage 421 for storing a bookmark of each user is included in the IPTV service provider network 420.

An IG (or WG) 431, which is connectable to the IPTV service provider network 420, is included in a bookmark sharer home network 430, and an OITF terminal B 432 can download the bookmark stored in the storage 421 of the IPTV service provider network 420.

The OITF terminal B 432 includes a download function module 435 and a DLNA function module 433 capable of communicating with other DLNA devices, such as DLNA device 434, in the home. That is, the DLNA device 434 shares (step 418) a bookmark with OITF terminal B 432 through UPnP.

FIG. 5A is a table illustrating metadata used to share a UPnP bookmark with other users according to an embodiment of the present invention. That is, FIG. 5A illustrates metadata used to share a bookmark of contents or an IPTV service according to an embodiment of the present invention.

Referring to FIG. 5A, a metadata element "share" indicates a name or title of the bookmark for sharing. A metadata element "share@creatorid" indicates a user ID who created the bookmark, which is identical to an ID of an IPTV service provider for sharing and thus can be recognized by the service provider.

A metadata element "share@type" classifies the sharing types. If its value is "public", this indicates that the bookmark can be shared by anyone of the subscribers of the IPTV service provider. If its value is "Limited Public", it can be used to share with a specific one of the subscribers of the IPTV service provider and is accompanied with a metadata element "share@shareuserid". If its value is "Private", this indicates that the user uses the bookmark privately without sharing the same with other users.

The metadata element "share@shareuserid" is metadata for a user ID for sharing the bookmark. The user ID is a unique value in the IPTV service provider network, which may be determined by the bookmark creator through a search mechanism or through an address book determined in other application program such as a communication program.

A metadata element "share@validityperiod" indicates the available period of the bookmark for share in the IPTV service provider network.

FIG. 5B is a table illustrating metadata used to share a UPnP bookmark with other users according to another embodiment of the present invention. That is, FIG. 5B illustrates metadata used to share a bookmark of contents or an IPTV service according to an embodiment of the present invention.

FIG. 5B illustrates a metadata element "share@shareuserid" that includes a metadata element "share@type". If metadata element "share@type" has a value that is a wildcard "*", this indicates that the bookmark is shared with all the users of the IPTV service provider. If its value is empty, this indicates that the bookmark is not shared with other users. If its value is a specific "userid" sequence, this indicates that the bookmark is shared only with specific users.

Table 2 below shows an example of bookmark metadata according to an embodiment of the present invention. In this embodiment, a user "JiEun" creates a bookmark "our full shot" to be shared with selected users "Bosun" and "Junhyung" for a period of one week.

TABLE 2

```
<?xml version="1.0" encoding="UTF-8"?>
<DIDL-Lite
xmlns:dc="http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:xsi="http://www.w3.org/2001/XMLSchema-instance"
xsi:schemaLocation="
urn:schemas-upnp-org:metadata-1-0/DIDL-Lite/
http://www.upnp.org/schemas/av/didl-lite.xsd
urn:schemas-upnp-org:metadata-1-0/upnp/
http://www.upnp.org/schemas/av/upnp.xsd">
<item id="bookmark-763215" parentID="BC_001"
restricted="0">
<dc:title>workshop </dc:title>
<upnp:class>object.item.bookmarkItem</upnp:class>
<upnp:share creatorid="JiEun" type="limited public"
shareuserid="Bosun,Junhyung" validityperid="1
week"> our full shot </share>
<upnp:deviceUDN serviceType="AVTransport:1"
serviceId="AVTransport">
uuid:2F5A2466-55EF-44af-953A-74DE96FF2B14
</upnp:deviceUDN>
<upnp:deviceUDN serviceType="RenderingControl:1"
serviceId="RenderingControl">
uuid:EF0DB408-3018-4e13-831A-8349CA543538
</upnp:deviceUDN>
<upnp:bookmarkedObjectID>1230131</upnp:bookmarkedObjectID>
<dc:date>2003-03-21T15:21:22</dc:date>
<upnp:stateVariableCollection serviceName="AVTransport">
<!--
The following stateVariableValuePairs XML Document needs to be
interpreted as a simple string and therefore needs to be properly escaped
-->
&lt;?xml version="1.0" encoding="UTF-8"?&gt;
&lt;stateVariableValuePairs
xmlns="urn:schemas-upnp-org:av:avs"
xmlns:xsi="http://www.w3.org/2001/XMLSchema-instance"
xsi:schemaLocation="
urn:schemas-upnp-org:av:avs
http://www.upnp.org/schemas/av/avs.xsd"&gt;
&lt;stateVariable variableName="RelativeTimePosition"&gt;
00:22:01
&lt;stateVariable&gt;
&lt;!-- More state variable value pairs can
be inserted here --&gt;
&lt;/stateVariableValuePairs&gt;
<!-- End of stateVariableValuePairs XML Document -->
```

Table 3 shows an example of bookmark metadata according to an embodiment of the present invention. In this embodiment, a user "JiEun" creates a bookmark "funny pose" to be shared with all the subscribers in the IPTV service provider network.

TABLE 3

```
<?xml version="1.0" encoding="UTF-8"?>
<DIDL-Lite
xmlns:dc="http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:xsi="http://www.w3.org/2001/XMLSchema-instance"
xsi:schemaLocation="
urn:schemas-upnp-org:metadata-1-0/DIDL-Lite/
http://www.upnp.org/schemas/av/didl-lite.xsd
urn:schemas-upnp-org:metadata-1-0/upnp/
http://www.upnp.org/schemas/av/upnp.xsd">
<item id="bookmark-763215" parentID="BC_001"
restricted="0">
<dc:title>workshop</dc:title>
<upnp:class>object.item.bookmarkItem</upnp:class>
<upnp:share creatorid="JiEun" type="public">'funny pose </share>
<upnp:deviceUDN serviceType="AVTransport:1"
serviceId="AVTransport">
uuid:2F5A2466-55EF-44af-953A-74DE96FF2B14
</upnp:deviceUDN>
<upnp:deviceUDN serviceType="RenderingControl:1"
serviceId="RenderingControl">
uuid:EF0DB408-3018-4e13-831A-8349CA543538
</upnp:deviceUDN>
<upnp:bookmarkedObjectID>1230131</upnp:bookmarkedObjectID>
<dc:date>2003-03-21T15:21:22</dc:date>
<upnp:stateVariableCollection serviceName="AVTransport">
```

Table 4 shows an example of bookmark metadata according to an embodiment of the present invention. In this embodiment, a user "JiEun" creates a bookmark "pretty scene" to be accessed only by the user "JiEun", i.e., without being shared with other users.

TABLE 4

```
<?xml version="1.0" encoding="UTF-8"?>
<DIDL-Lite
xmlns:dc="http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:xsi="http://www.w3.org/2001/XMLSchema-instance"
xsi:schemaLocation="
urn:schemas-upnp-org:metadata-1-0/DIDL-Lite/
http://www.upnp.org/schemas/av/didl-lite.xsd
urn:schemas-upnp-org:metadata-1-0/upnp/
http://www.upnp.org/schemas/av/upnp.xsd">
<item id="bookmark-763215" parentID="BC_001"
restricted="0">
<dc:title>workshop </dc:title>
<upnp:class>object.item.bookmarkItem</upnp:class>
<upnp:share creatorid="JiEun" type="private">'pretty scene'</share>
<upnp:deviceUDN serviceType="AVTransport:1"
serviceId="AVTransport">
uuid:2F5A2466-55EF-44af-953A-74DE96FF2B14
</upnp:deviceUDN>
<upnp:deviceUDN serviceType="RenderingControl:1"
serviceId="RenderingControl">
uuid:EF0DB408-3018-4e13-831A-8349CA543538
</upnp:deviceUDN>
<upnp:bookmarkedObjectID>1230131</upnp:bookmarkedObjectID>
<dc:date>2003-03-21T15:21:22</dc:date>
<upnp:stateVariableCollection serviceName="AVTransport">
</item>
```

Figure 6:
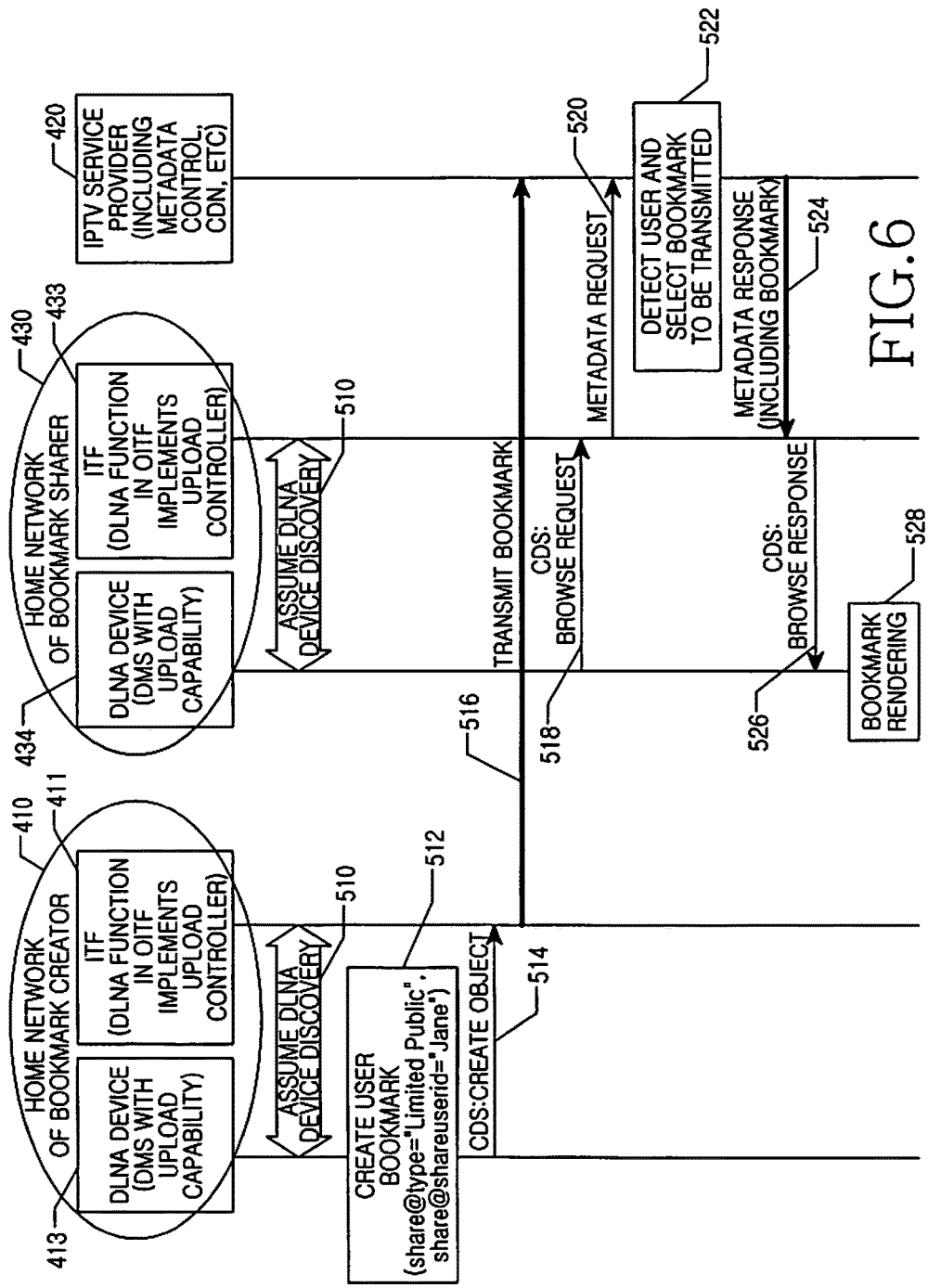
FIG. 6 is a flow diagram illustrating a method for sharing a UPnP bookmark with other users, according to an embodiment of the present invention.

FIG. 6 is a flow diagram illustrating a method for sharing a UPnP bookmark with other users, according to an embodiment of the present invention. Hereinafter, an OITF terminal will be referred to as an ITF terminal Referring to FIG. 6, in step 510, it is assumed that the IPTV terminal (ITF) 411 and the DLNA device 413 present in a bookmark creator home network 410 are connected to each other. Also, it is assumed that the IPTV terminal (ITF) 433 and the DLNA device 434 present in a bookmark sharer home network 430 are connected to each other.

In step 512, the DLNA device 413 creates a metadata value of a bookmark for share. At this point, a share type and a user ID for sharing are determined.

In step 514, the DLNA device 413 stores a bookmark in the ITF 411 by using a command "Create Object" of a service CDS of the UPnP.

In step 516, the ITF 411 transmits a created bookmark to the IPTV service provider 420.

In step 518, the DLNA device 434 requests an available bookmark for itself through the ITF 433 included in the bookmark sharer home network 430, using a CDS command "Browse Request" of the UPnP. In step 520, upon receiving the command, the ITF 433 transmits a metadata request to the IPTV service provider 420.

In step 522, the IPTV service provider 420 detects a user wanting bookmark sharing, and selects a bookmark available for the detected user. In step 524, the IPTV service provider 420 transmits a metadata response command including the bookmark to the ITF 433.

In step 526, the ITF 433 transmits the bookmark using a CDS command "Browse Response".

In step 528, the DLNA device 434 renders the bookmark received through the ITF 433.

Figure 7:
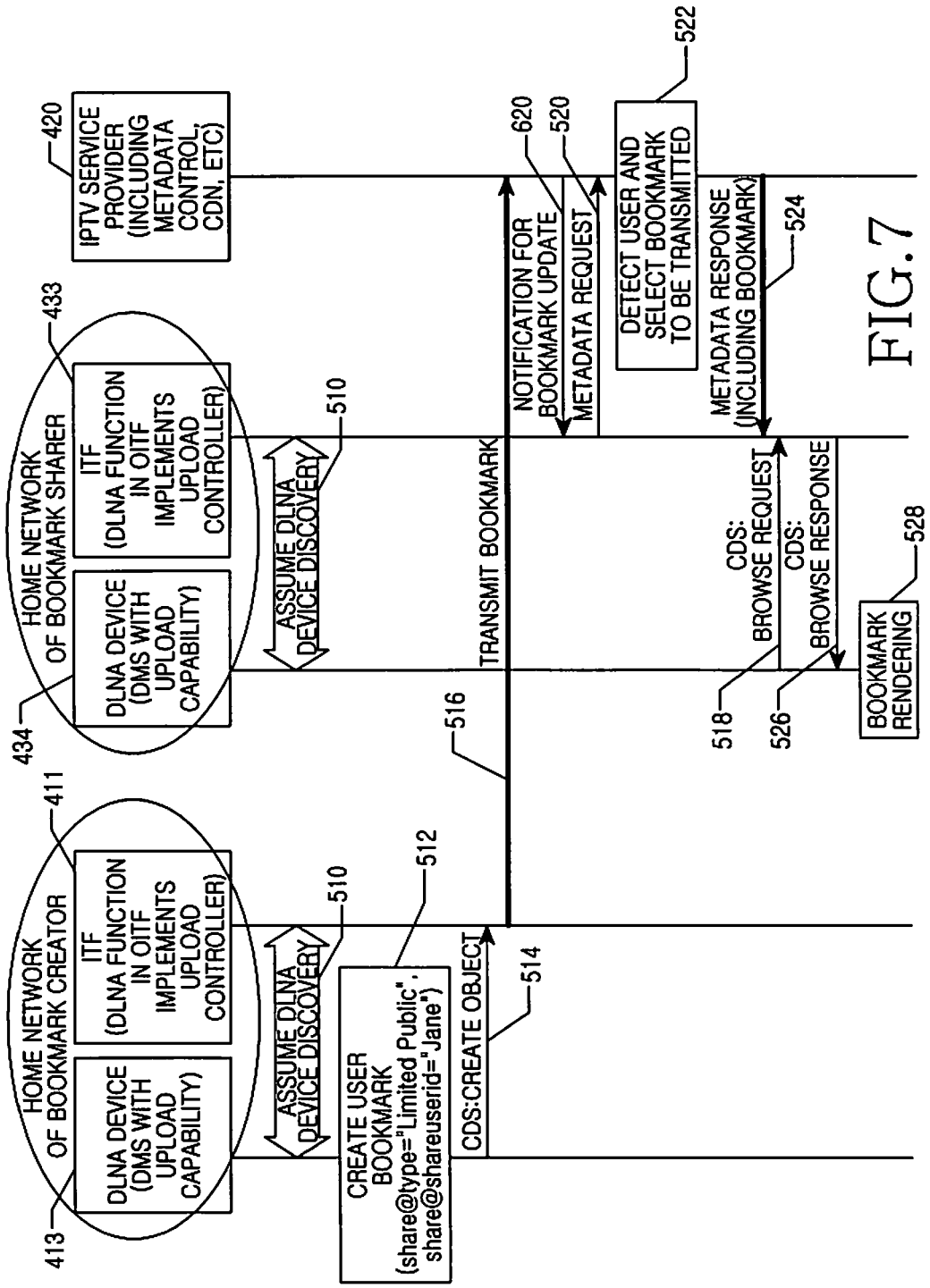
FIG. 7 is a flow diagram illustrating a method for sharing a UPnP bookmark with other users, according to an embodiment of the present invention.

FIG. 7 is a flow diagram illustrating a method for sharing a UPnP bookmark with other users, according to another embodiment of the present invention. In FIG. 7, steps 510 to 528 are the same as already described in conjunction with FIG. 6. Therefore, the same description will not be repeated herein for FIG. 7

Referring to FIG. 7, when a sharable bookmark is transmitted in step 516, the IPTV service provider 420 automatically transmits a notification message to the ITF 433, included in a shared user ID, in step 620 to notify the completion of bookmark update. Accordingly, the sharer can always know the updated bookmark information.

Figure 8:
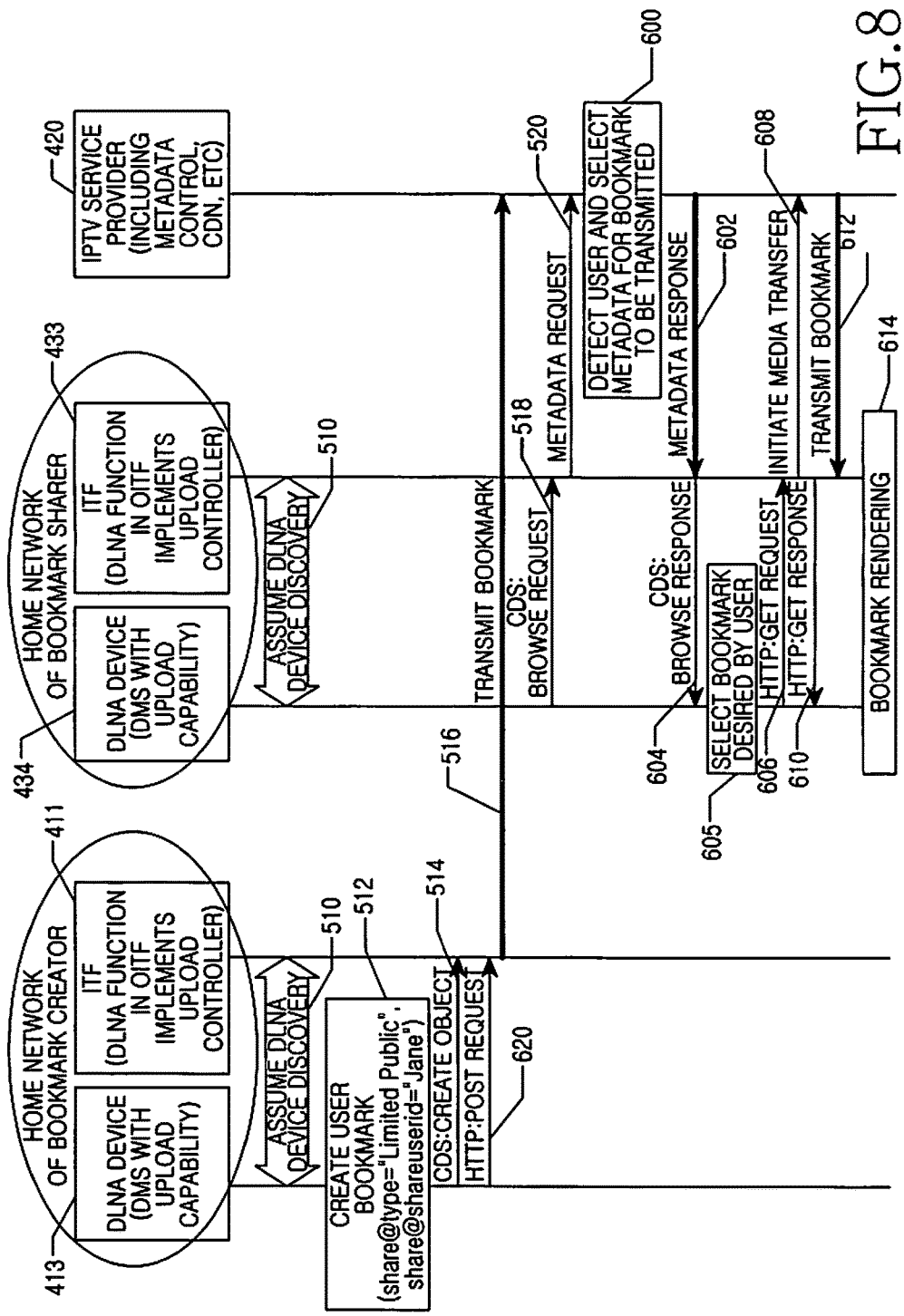
FIG. 8 is a flow diagram illustrating a method for sharing a UPnP bookmark with other users, according to an embodiment of the present invention.

FIG. 8 is a flow diagram illustrating a method for sharing a UPnP bookmark with other users, according to another embodiment of the present invention. In FIG. 8, steps 510 to 520 are basically the same as already described in conjunction with FIG. 6. Therefore, the same description will not be repeated herein for FIG. 8.

Referring to FIG. 8, this flow diagram illustrates a scenario in which the bookmark is considered as a content, not as metadata. That is, the DLNA device 413 transmits some information of the bookmark by metadata of the bookmark, and transmits one bookmark media including time stamp information, i.e., state information indicated by the bookmark.

The DLNA device 413 transmits metadata information of the bookmark to the ITF 411 in step 514, and transmits bookmark media in step 620.

In step 516, the ITF 411 transmits the metadata of the bookmark and the bookmark media to the IPTV service provider 420. In step 600, the IPTV service provider 420 selects metadata for the bookmark to be transmitted.

In step 602, the IPTV service provider 420 transmits reference contents title information and creator information, i.e., the metadata of the bookmark available for the sharer, to the ITF 433, and in step 604, the ITF 433 transmits a CDS command "Browse Response" to the DLNA device 434

In step 605, the DLNA device 434 selects a bookmark to be used by the user, on the basis of the additional information of the bookmark transmitted by the ITF 433 in step 604.

In step 606, the DLNA device 434 requests the media of the selected book to the ITF 433 using an HTTP GET Request command. In step 608, the ITF 433 initiates a media transfer operation. Step 610 denotes a response to the HTTP GET Request.

In step 612, the ITF 433 receives the bookmark media from the IPTV service provider 420. The bookmark in step 612 denotes actual bookmark media, and in step 614, the DLNA device 434 is used to execute the actual media of the received bookmark via bookmark rendering.

Figure 9:
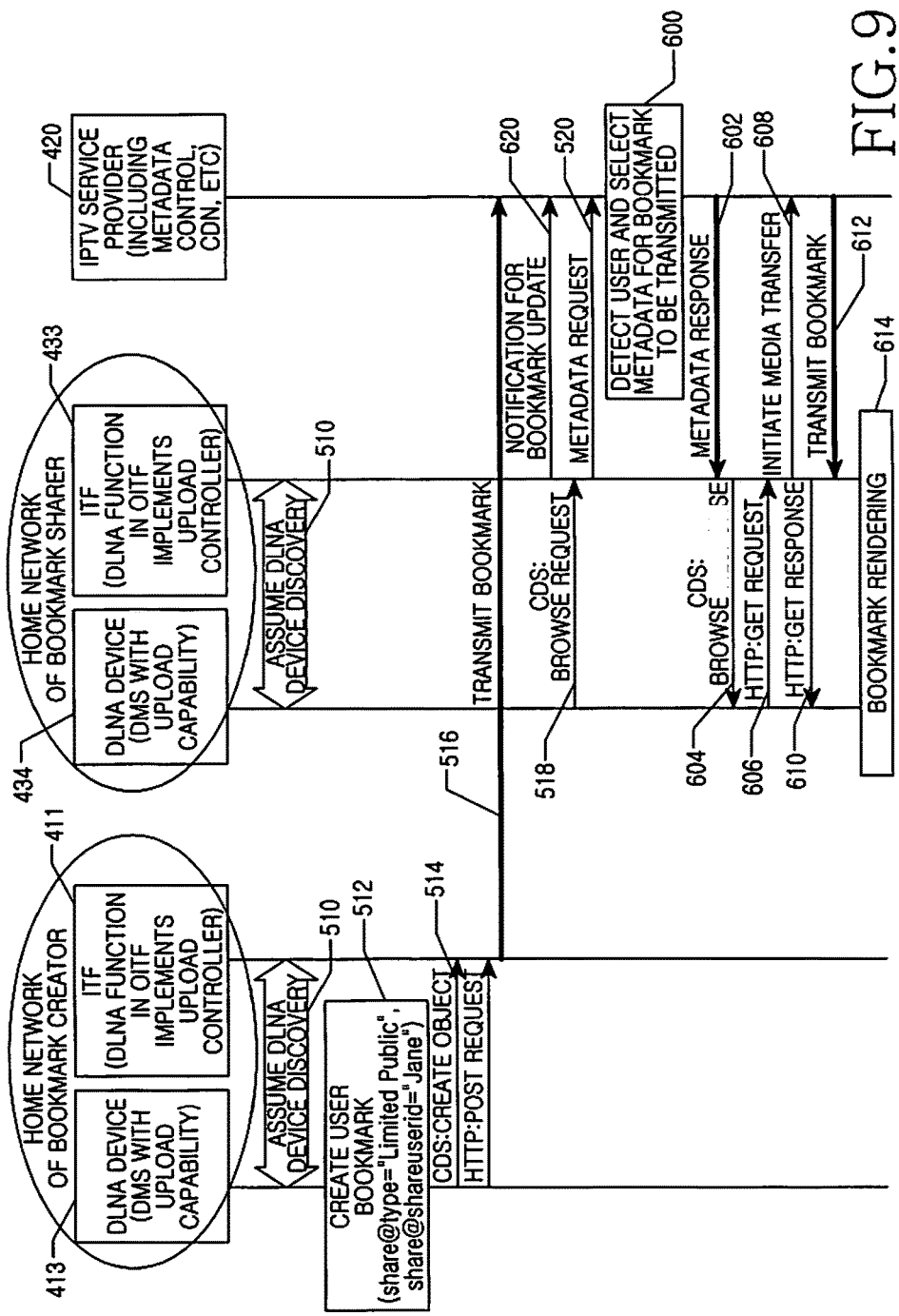
FIG. 9 is a flow diagram illustrating a method for sharing a UPnP bookmark with other users, according to an embodiment of the present invention.

FIG. 9 is a flow diagram illustrating a method for sharing a UPnP bookmark with other users, according to another embodiment of the present invention.

Referring to FIG. 9, similarly to FIG. 7, this flow diagram illustrates a scenario in which the IPTV service provider 420 automatically transmits a notification message indicating the completion of bookmark update in step 620, if the bookmark is to be transmitted to one media.

In step 620, the IPTV service provider 420 transmits a notification message carrying information indicating the completion of update of sharable bookmark to the ITF 433. The other steps are identical to the corresponding steps of FIG. 8.

Figure 10:
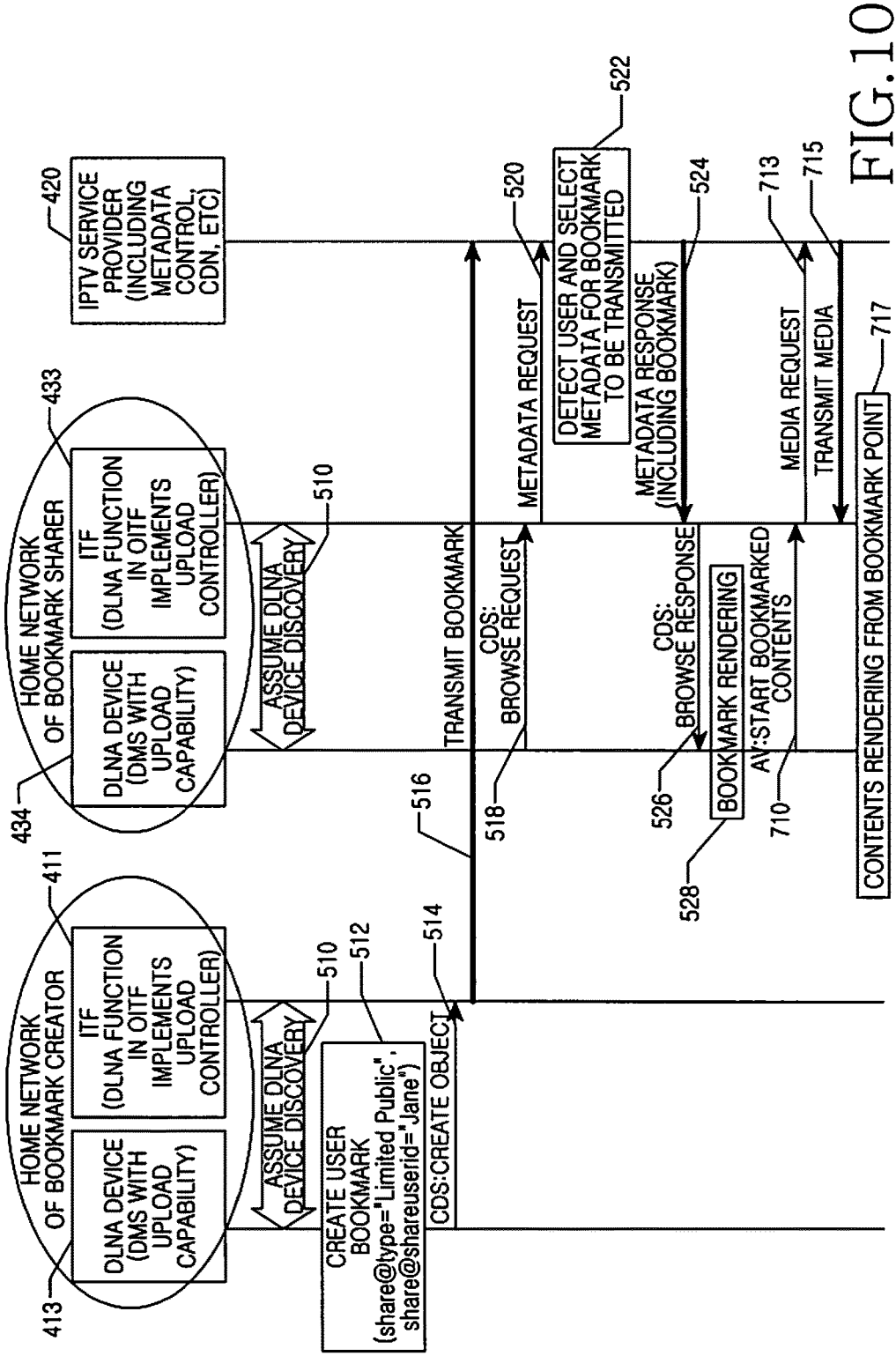
FIG. 10 is a flow diagram illustrating a method for sharing a UPnP bookmark with other users, according to an embodiment of the present invention.

FIG. 10 is a flow diagram illustrating a method for sharing a UPnP bookmark with other users, according to another embodiment of the present invention.

Referring to FIG. 10, the IPTV service provider 420 selects a bookmark in step 522. In steps 524 and 526, the DLNA device 434 downloads the selected bookmark from the IPTV service provider 420. In step 528, the DLNA device 434 performs rendering. However, if a service or contents referred to by the bookmark is not present in the home network of the bookmark sharer, the DLNA device 434 downloads the service or contents referred to by the bookmark from the IPTV service provider 420.

In step 710, the DLNA device 434 gives a Start command (one of UPnP AV commands) to pay for the contents referred to by the pre-rendered bookmark. In step 713, the ITF 433 transmits a Media Request command including an ID of the contents referred to by the bookmark to the IPTV service provider 420. In step 715, the IPTV service provider 420 transmits the requested contents to the ITF 433.

In step 717, the bookmark sharer executes the downloaded contents through the DLNA device 434, together with the bookmark received in step 526, thereby rendering the contents from the bookmark point. The other steps are identical to the corresponding steps of FIG. 9.

Also, the functions as described in the embodiments of the present invention may be performed by a control unit. For example, the functions may exist as software programs in the devices in the embodiments of the present invention. The software programs are controlled by a Central Processing Unit (CPU), i.e., the control unit. Therefore, the functions as described in the embodiments of the present invention may be performed by a control unit.

The above-described embodiments of the present invention are based on a premise that an ID of content referred to by a bookmark is a unique value in an IPTV service provider.

As described above, the apparatus and method for sharing a bookmark with other users in a home network according to embodiments of the present invention have the following effects.

An IPTV service subscriber is able to share his bookmark with other users, thereby making it possible to create a new service. Also, other users can be selected for bookmark sharing, thereby making it possible to provide privacy protection. Also, an IPTV service provider can create new profits by managing a bookmark as one content item and sharing the same.

While the present invention has been shown and described with reference to certain embodiments thereof, it will be understood by those skilled in the art that various changes in form and details may be made therein without departing from the spirit and scope of the present invention as defined by the appended claims. Therefore, the scope of the invention is defined not by the detailed description of the present invention, but by the appended claims, and all differences within the scope shall be construed as being included in the present invention.

What is claimed is:

1. A method for operating an internet protocol TV (IPTV) device in a first home network, the method comprising:
   transmitting, by at least one transceiver of the IPTV device in the first home network, a request for an available bookmark, to a service provider via an IPTV terminal in the first home network;
   receiving, by the at least one transceiver, a response for the request which comprises a bookmark and metadata for the bookmark including an identifier (ID) of the first home network;
   transmitting, by the at least one transceiver, a message for requesting a content referred by the bookmark, to the service provider via the IPTV terminal;
   receiving, by the at least one transceiver, the content, from the service provider via the IPTV terminal; and
   playing, by at least one processor of the IPTV device in the first home network, the content based on the bookmark,
   wherein the bookmark and the metadata for the bookmark are generated by an IPTV device in a second home network,
   wherein the ID is set by the IPTV device in the second home network, and
   wherein, in response to receiving of the bookmark by the service provider, a message notifying a bookmark update for the bookmark is transmitted from the service provider to the IPTV terminal in the first home network based on the ID in the metadata for the bookmark.

2. The method of claim 1, wherein the bookmark comprises media.

3. The method of claim 1, wherein the metadata comprises at least one of the ID, a sharing type, a title of the bookmark for sharing, another ID of the second home network, and an available period for bookmark sharing.

4. The method of claim 1, wherein the content is provided from the service provider which is located outside of the first home network and the second home network.

5. A method for operating an internet protocol TV (IPTV) terminal in a first home network, the method comprising:
   transmitting, by at least one transceiver of the IPTV terminal in the first home network, a request for an available bookmark to a service provider;
   receiving, by the at least one transceiver from the service provider a response for the request which comprises a bookmark and metadata for the bookmark including an identifier (ID) of the first home network;
   transmitting, by the at least one transceiver to the service provider, a message for requesting a content referred by the bookmark;
   receiving, by the transceiver from the service provider, the content,
   wherein the received content is provided to an IPTV device in the first home network so that the IPTV device in the first home network plays the content based on the bookmark,
   wherein the bookmark and the metadata for the bookmark are generated by an IPTV device in a second home network,
   wherein the ID is set by the IPTV device in the second home network, and
   wherein, in response to receiving of the bookmark by the service provider, a message notifying a bookmark update for the bookmark is transmitted from the service provider to the IPTV terminal in the first home network based on the ID in the metadata for the bookmark.

6. The method of claim 5, further comprising:
   receiving a request for the content referred to by the bookmark from the IPTV device in the first home network; and
   transmitting the content to the IPTV device in the first home network.

7. The method of claim 5, wherein the bookmark comprises media.

8. The method of claim 5, wherein the metadata comprises at least one of the ID, a sharing type, a title of the bookmark for sharing, another ID of the second home network, and an available period for bookmark sharing.

9. The method of claim 5, wherein the content is provided from the service provider which is located outside of the first home network and the second home network.

10. A method for operating an internet protocol TV (IPTV) device in a second home network, the method comprising:
    generating, by at least one processor of the IPTV device in the second home network, a bookmark for a content and metadata for the bookmark;
    setting, by the at least one processor, an identifier (ID) of a first home network to be included in the metadata for the bookmark;
    transmitting, by at least one transceiver of the IPTV device in the second home network, the bookmark and the metadata for the bookmark including the ID, to a service provider via an IPTV terminal in the second home network,
    wherein the bookmark is provided to an IPTV device in the first home network based on the ID,
    wherein the content is requested and received by the IPTV device in the first home network based on the metadata for the bookmark,
    wherein the content is played by the IPTV device in the first home network based on the bookmark, and
    wherein, in response to the service provider receiving the bookmark, a message notifying a bookmark update for the bookmark is transmitted from the service provider to the IPTV terminal in the first home network based on the ID in the metadata for the bookmark.

11. The method of claim 10, wherein the bookmark comprises media.

12. The method of claim 10, wherein the metadata comprises at least one of the ID, a sharing type, a title of the bookmark for sharing, another ID of the second home network, and an available period for bookmark sharing.

13. The method of claim 10, wherein the content is provided from a service provider which is located outside of the first home network and the second home network.

14. A method for operating an internet protocol TV (IPTV) terminal in a second home network, the method comprising:

receiving, by at least one transceiver of the IPTV terminal in the second home network from an IPTV device in the second home network, a bookmark for a content and metadata for the bookmark including an identifier (ID) of a first home network; and transmitting, by the at least one transceiver to a service provider, the bookmark and the metadata for the bookmark including the ID, wherein the ID is set by the IPTV device in the second home network, and wherein the bookmark is provided to an IPTV device in the first home network based on the ID, wherein the content is requested and received by the IPTV device in the first home network based on the metadata for the bookmark, wherein the content is played by the IPTV device in the first home network based on the bookmark, and wherein, in response to the service provider receiving the bookmark, a message notifying a bookmark update for the bookmark is transmitted from the service provider to the IPTV terminal in the first home network based on the ID in the metadata for the bookmark.

15. The method of claim 14, wherein the bookmark comprises media.

16. The method of claim 14, wherein the metadata comprises at least one of the ID, a sharing type, a title of the bookmark for sharing, another ID of the second home network, and an available period for bookmark sharing.

17. The method of claim 14, wherein the content is provided from the service provider which is located outside of the first home network and the second home network.

18. An apparatus for an internet protocol TV (IPTV) device in a first home network, the apparatus comprising:
at least one transceiver configured to:
transmit a request for an available bookmark, to service provider via an IPTV terminal in the first home network,
receive a response for the request which comprises a bookmark and metadata for the bookmark including an identifier (ID) of the first home network,
transmit a message for requesting a content referred by the bookmark, to the service provider via the IPTV terminal, and
receive the content, from the service provider via the IPTV terminal; and
at least one processor configured to play the content based on the bookmark,
wherein the bookmark and the metadata for the bookmark are generated by an IPTV device in a second home network,
wherein the ID is set by the IPTV device in the second home network, and
wherein, in response to receiving of the bookmark by the service provider, a message notifying a bookmark update for the bookmark is transmitted from the service provider to the IPTV terminal in the first home network based on the ID in the metadata for the bookmark.

19. The apparatus of claim 18, wherein the bookmark comprises media.

20. The apparatus of claim 18, wherein the metadata comprises at least one of the ID, a sharing type, a title of the bookmark for sharing, another ID of the second home network, and an available period for bookmark sharing.

21. The apparatus of claim 18, wherein the content is provided from the service provider which is located outside of the first home network and the second home network.

22. An apparatus for an internet protocol TV (IPTV) terminal in a first home network, the apparatus comprising:
at least one processor; and
at least one transceiver configured to:
transmit a request for an available bookmark to a service provider;
receive, from the service provider, a response for the request which comprises a bookmark and metadata for the bookmark including an identifier (ID) of the first home network;
transmit, to the service provider, a message for requesting a content referred by the bookmark;
receive, from the service provider, the content,
wherein the received content is provided to an IPTV device in the first home network so that the IPTV device in the first home network plays the content based on the bookmark,
wherein the bookmark and the metadata for the bookmark are generated by an IPTV device in a second home network,
wherein the ID is set by the IPTV device in the second home network, and
wherein, in response to receiving of the bookmark by the service provider, a message notifying a bookmark update for the bookmark is transmitted from the service provider to the IPTV terminal in the first home network based on the ID in the metadata for the bookmark.

23. The apparatus of claim 22, wherein the at least one transceiver is further configured to receive, from the second home network, a notification message indicating that the bookmark and the metadata for the bookmark are provided from the second home network.

24. The apparatus of claim 22, wherein the bookmark comprises media.

25. The apparatus of claim 22, wherein the metadata comprises at least one of the ID, a sharing type, a title of the bookmark for sharing, another ID of the second home network, and an available period for bookmark sharing.

26. The apparatus of claim 22, wherein the content is provided from the service provider which is located outside of the first home network and the second home network.

27. An apparatus for an internet protocol TV (IPTV) device in a second home network, the apparatus comprising:
at least one processor configured to generate a bookmark for a content and metadata for the bookmark, and set an identifier (ID) of a first home network to be included in the metadata for the bookmark; and
at least one transceiver configured to transmit the bookmark and the metadata for the bookmark including the ID, to a service provider via an IPTV terminal in the second home network,
wherein the bookmark is provided to an IPTV device in the first home network based on the ID,
wherein the content is requested and received by the IPTV device in the first home network based on the metadata for the bookmark,
wherein the content is played by the IPTV device in the first home network based on the bookmark, and
wherein, in response to the service provider receiving the bookmark, a message notifying a bookmark update for the bookmark is transmitted from the service provider to the IPTV terminal in the first home network based on the ID in the metadata for the bookmark.

28. The apparatus of claim 27, wherein the bookmark comprises media.

29. The apparatus of claim 27, wherein the metadata comprises at least one of the ID, a sharing type, a title of the bookmark for sharing, another ID of the second home network, and an available period for bookmark sharing.

30. The apparatus of claim 27, wherein the content is provided from the service provider which is located outside of the first home network and the second home network.

31. An apparatus for an internet protocol TV (IPTV) terminal in a second home network, the apparatus comprising:
   at least one processor; and
   at least one transceiver configured to:
      receive, from an IPTV device in the second home network, a bookmark for a content and metadata for the bookmark including an identifier (ID) of a first home network, and
      transmit, to a service provider, the bookmark and the metadata for the bookmark including the ID,
   wherein the ID is set by the IPTV device in the second home network,
   wherein the bookmark is provided to an IPTV device in the first home network based on the ID,
   wherein the content is requested and received by the IPTV device in the first home network based on the metadata for the bookmark,
   wherein the content is played by the IPTV device in the first home network based on the bookmark, and
   wherein, in response to the service provider receiving the bookmark, a message notifying a bookmark update for the bookmark is transmitted from the service provider to the IPTV terminal in the first home network based on the ID in the metadata for the bookmark.

32. The apparatus of claim 31, wherein the bookmark comprises media.

33. The apparatus of claim 31, wherein the metadata comprises at least one of the ID, a sharing type, a title of the bookmark for sharing, another ID of the second home network, and an available period for bookmark sharing.

34. The apparatus of claim 31, wherein the content is provided from the service provider which is located outside of the first home network and the second home network.

* * * * *